(12) United States Patent
Zhao et al.

(10) Patent No.: US 11,327,711 B2
(45) Date of Patent: May 10, 2022

(54) EXTERNAL VISUAL INTERACTIONS FOR SPEECH-BASED DEVICES

(71) Applicant: Microsoft Technology Licensing, LLC, Redmond, WA (US)

(72) Inventors: Weidong Zhao, Bellevue, WA (US); Gary Caldwell, Redmond, WA (US); Ruchi Bhargava, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 336 days.

(21) Appl. No.: 14/562,491

(22) Filed: Dec. 5, 2014

(65) Prior Publication Data

US 2016/0162259 A1 Jun. 9, 2016

(51) Int. Cl.
*G06F 3/16* (2006.01)
*G06F 3/0484* (2022.01)
(Continued)

(52) U.S. Cl.
CPC ............ *G06F 3/167* (2013.01); *G06F 3/0484* (2013.01); *G06F 3/0488* (2013.01); *G10L 15/22* (2013.01);
(Continued)

(58) Field of Classification Search
CPC ...... G06F 17/243; G06F 17/246; G06F 3/167; G06F 3/0484; G06F 3/0488;
(Continued)

(56) References Cited

U.S. PATENT DOCUMENTS 8,055,296 B1* 11/2011 Persson ............... G02B 27/017
455/456.1
8,590,023 B2 11/2013 Gupta et al.
(Continued)

FOREIGN PATENT DOCUMENTS

CN 102668391 A 9/2012
CN 103091844 A 5/2013
(Continued)

OTHER PUBLICATIONS

Lei Wang, A Performance Evaluation of Dynamic Transport Switching for Multi-Transport Devices, Nov. 17, 2006.*
(Continued)

*Primary Examiner* — Cesar B Paula
*Assistant Examiner* — Carl E Barnes, Jr.
(74) *Attorney, Agent, or Firm* — Alleman Hall Creasman & Tuttle LLP (57) ABSTRACT

Examples are disclosed herein that are related to providing extended functionalities on-demand to an audio-based wearable device. One example provides a wearable computing device including an acoustic receiver configured to receive speech inputs, a speaker configured to present audio outputs, a communications subsystem configured to connect to an external device, a logic subsystem configured to execute instructions, and a storage subsystem having instructions executable by the logic subsystem to execute a program, connect to the external device via a wireless communications protocol, conduct an audio-based interaction of the program via the speech inputs received at the acoustic receiver and the audio outputs provided by the speaker, upon reaching a screen-based interaction of the program, notify a user via the speaker to interact with the external device, and provide image data to the external device for presentation via a screen of the external device.

20 Claims, 6 Drawing Sheets

(51) Int. Cl.
*G10L 15/22* (2006.01)
*H04N 21/422* (2011.01)
*H04N 21/4363* (2011.01)
*H04N 21/41* (2011.01)
*H04N 21/439* (2011.01)
*G06F 3/0488* (2022.01)
*H04M 1/72412* (2021.01)

(52) U.S. Cl.
CPC ... *H04N 21/4122* (2013.01); *H04N 21/42203* (2013.01); *H04N 21/4394* (2013.01); *H04N 21/43637* (2013.01); *G06F 2203/0381* (2013.01); *G10L 2015/225* (2013.01); *H04M 1/72412* (2021.01)

(58) Field of Classification Search
CPC . G06F 2203/0381; G10L 15/22; G10L 15/30; G10L 2015/225; H04W 4/02; H04N 21/4122; H04N 21/42203; H04N 21/43637; H04N 21/4394; H04M 1/7253; H04M 1/72412; H04M 1/7242
USPC .......................... 715/243–246, 251–252, 234
See application file for complete search history.

(56) References Cited

U.S. PATENT DOCUMENTS

| | | | |
|---|---|---|---|
| 8,594,467 B2 | 11/2013 | Lu et al. | |
| 8,725,133 B2* | 5/2014 | Park | G06F 3/0484 455/418 |
| 8,743,696 B2 | 6/2014 | Chowdhury | |
| 8,824,315 B2 | 9/2014 | Kokkinen et al. | |
| 10,015,234 B2* | 7/2018 | Sudhakaran | H04L 67/10 |
| 2003/0157960 A1* | 8/2003 | Kennedy | H04M 1/7253 455/556.1 |
| 2005/0182847 A1* | 8/2005 | Jawad Pirzada | H04L 43/08 709/233 |
| 2005/0202844 A1* | 9/2005 | Jabri | A61B 6/4494 455/556.1 |
| 2006/0203758 A1 | 9/2006 | Tee et al. | |
| 2007/0238484 A1* | 10/2007 | Liu | H04M 1/6066 455/557 |
| 2008/0318681 A1 | 12/2008 | Rofougaran et al. | |
| 2010/0302141 A1 | 12/2010 | Shankar et al. | |
| 2012/0016678 A1* | 1/2012 | Gruber | G06F 17/3087 704/275 |
| 2012/0229270 A1 | 9/2012 | Morley et al. | |
| 2012/0311583 A1* | 12/2012 | Gruber | H04W 4/02 718/100 |
| 2013/0018659 A1 | 1/2013 | Chi et al. | |
| 2013/0111348 A1* | 5/2013 | Gruber | G10L 13/08 715/727 |
| 2013/0197907 A1* | 8/2013 | Burke | G10L 15/22 704/231 |
| 2013/0241806 A1 | 9/2013 | Bathiche et al. | |
| 2013/0275875 A1* | 10/2013 | Gruber | G10L 15/22 715/728 |
| 2013/0339859 A1 | 12/2013 | Hardi | |
| 2014/0003239 A1 | 1/2014 | Etemad et al. | |
| 2014/0043966 A1 | 2/2014 | Lee et al. | |
| 2014/0120983 A1 | 5/2014 | Lam | |
| 2014/0139454 A1 | 5/2014 | Mistry et al. | |
| 2014/0143785 A1 | 5/2014 | Mistry et al. | |
| 2014/0198035 A1 | 7/2014 | Bailey et al. | |
| 2014/0232632 A1 | 8/2014 | Hodges et al. | |
| 2014/0241540 A1* | 8/2014 | Hodges | H04R 1/1091 381/74 |
| 2015/0121230 A1* | 4/2015 | Kulavik | G06F 3/167 715/728 |
| 2016/0048759 A1* | 2/2016 | Sudhakaran | H04L 67/10 706/11 |
| 2016/0163315 A1* | 6/2016 | Choi | H04L 41/22 704/275 |
| 2016/0306607 A1* | 10/2016 | Peng | G06F 3/167 |
| 2019/0149584 A1* | 5/2019 | DiBello | H04L 12/1822 |

FOREIGN PATENT DOCUMENTS

| | | | |
|---|---|---|---|
| CN | 103226949 A | 7/2013 | |
| CN | 103533148 A | 1/2014 | |
| CN | 103535051 A | 1/2014 | |
| KR | 20130064548 A | 6/2013 | |
| WO | 2013050070 A1 | 4/2013 | |
| WO | 2014113891 A1 | 7/2014 | |
| WO | WO-2015183368 A1 * | 12/2015 | ........... G06F 3/0484 |

OTHER PUBLICATIONS

David Nield, Everything You Can Say to Your Amazon Echo, Mar. 10, 2016.*
Neil Hughes, Howto enable and use 'Hey Siri' handsfree mode in iOS 8, Sep. 17, 2014.*
Nield, David, Everything you can Say to Your Amazon Echo (Year: 2016).*
Bittner, R. et al., "Microsoft Research—Hardware Devices," http://research.microsoft.com/en-us/groups/hardware/, Available as Early as Apr. 20, 2011, 2 pages.
Doukas, C. et al., "Managing Wearable Sensor Data through Cloud Computing," 2011 Third IEEE International Conference on Cloud Computing Technology and Science, Nov. 29, 2011, 6 pages.
Srinivasan, D. et al., "Data Offload Approaches for Mobile Operators," http://www.wipro.com/documents/resource-center/Data_Offload_Approaches_for_Mobile_Operators.pdf, Oct. 21, 2012, 15 pages.
"Make Fitness a Lifestyle with Flex," Fitbit Flex Website, http://www.fitbit.com/flex, Available as Early as May 6, 2013, 7 pages.
"Wearable Computers," Motorola Solutions USA Website, http://www.motorolasolutions.com/US-EN/Business+Product +and+Services/Mobile+Comptuers/Wearable+Computers, Available as Early as May 7, 2013, 2 pages.
"XOEye Vision," XOEye Technologies Website, http://www.xoeye.com/vision, Available as Early as Feb. 13, 2014, 6 pages.
"The XOWi Smart Voice Badge," http://www.xowi.me/, Available as Early as Mar. 27, 2014, 8 pages.
Shah, A., "Cloud-Savvy Bluetooth 4.1 to Reach Devices by Year End," PC World Online Article, http://www.pcworld.com/article/2148560/cloudsavvy-bluetooth-41-to-reach-devices-by-year-end.html, Apr. 25, 2014, 3 pages.
Brown, E., "Wearable Tech to Keep Your Kids Safe," ZDNet Online Article, http://www.zdnet.com/wearable-tech-to-keep-your-kids-safe-7000029186/, May 7, 2014, 4 pages.
Moroney, L., "Building Cloud-Powered Wearable Apps," Google I/O 2014 Bytes Video, https://www.google.com/events/io/io14videos/0f43362f-93d0-e311-b297-00155d5066d7, Jun. 25, 2014, 1 page.
"Cloud Hosting, Wearable Devices and BYOD," Ascender Technologies Ltd. Website, http://www.ascender.com/remoteandroid, Retrieved Sep. 2, 2014, 3 pages.
ISA European Patent Office, International Search Report and Written Opinion Issued in Application No. PCT/US2015/062850, dated Mar. 14, 2016, WIPO, 12 pages.
IPEA European Patent Office, Second Written Opinion Issued in PCT Application No. PCT/US2015/062850, dated Nov. 11, 2016, WIPO, 4 pages.
IPEA European Patent Office, International Preliminary Report on Patentability Issued in PCT Application No. PCT/US2015/062850, dated Feb. 15, 2017, WIPO, 8 Pages.
"Office Action Issued in European Patent Application No. 15816580.3", dated Feb. 5, 2019, 4 Pages.
"Office Action And Search Report Issued In Chinese Application No. 201580066119.1", dated Apr. 22, 2019, 15 Pages.
"Second Office Action and Search Report Issued in Chinese Patent Application No. 201580066119.1", dated Dec. 23, 2019, 12 Pages.
"The XOWi Smart Voice Badge", Published on: Mar. 27, 2014, Available at: http://www.xowi.me/.

(56) References Cited

OTHER PUBLICATIONS

Ye, et al., "Current and Future Mobile and Wearable Device Use by People with Visual Impairments", In Proceedings of the SIGCHI Conference on Human Factors in Computing Systems, Apr. 26, 2014, pp. 3123-3132.
Sawhney, et al., "Speaking and Listening on the Run: Design for Wearable Audio Computing", In Proceedings of International Symposium on Wearable Computing, Oct. 19, 1998, 8 pages.
Ashbrook, et al., "Subtle and Eyes-Free Mobile Input with a Magnetically-Tracked Finger Ring", In Proceedings of the SIGCHI Conference on Human Factors in Computing Systems, May 7, 2011, pp. 2043-2046.
Spencer, Alex, "Baidu Unveils Location Ad Platform, Display-less Smart Glasses", Published on: Sep. 3, 2014, Available at http://mobilemarketingmagazine.com/baidu-unveils-location-ad-platform-display-less-smart-glasses/.
"Displayless Samsung S Band Fitness Tracker Tipped to Finally Make a Move", Retrieved on: Sep. 1, 2014, Available at http://www.superiortechcoupons.com/news/displayless-samsung-s-band-fitness-tracker-tipped-to-finally-make-a-move/.
"First Office Action Issued in Indian Patent Application No. 201747018484", dated Mar. 24, 2021, 6 Pages.

\* cited by examiner

EXTERNAL VISUAL INTERACTIONS FOR SPEECH-BASED DEVICES

BACKGROUND

Users may interact with electronic devices using a variety of different user interface mechanisms. Many computing devices now utilize user interfaces configured to accept natural, intuitive human interactions as input. For example, some such user interfaces utilize a display and a touch sensor located over the display for visual and tactile interactions, while others may utilize a speaker and microphone for speech/acoustic interactions.

SUMMARY

Examples are disclosed herein that relate to providing extended functionalities to a speech-based computing device. One example provides a computing device comprising an acoustic receiver configured to receive speech inputs, a speaker configured to present audio outputs, a communications subsystem configured to connect to an external device, a logic subsystem configured to execute instructions, and a storage subsystem comprising instructions executable by the logic subsystem to execute a program, connect to an external device via a wireless communications protocol, conduct an audio-based interaction of the program via the speech inputs received at the acoustic receiver and the audio outputs provided by the speaker, upon reaching a screen-based interaction of the program, notify a user via the speaker to interact with the external device, and provide image data to the external device for presentation via a screen of the external device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

A computing device may be configured to utilize acoustic interactions (e.g. speech inputs and acoustic outputs) as a primary user interface experience. Such speech-based computing devices may allow a user to interact with the computing device while maintaining visual attention on other things and/or while performing other tasks. Further, such devices may allow the use of a much smaller display, or even the omission of a display, compared to devices that utilize touch-sensitive displays. This may allow the device to have a smaller form factor than display-based devices, to be worn in a location not visible to the user (e.g. in an ear), and also may help to reduce power consumption of the device.

However, some data that a user accesses during a computing device interaction may be less suitable for acoustic presentation. For example, map data may be presented with richer data visually than acoustically. As another example, where a search performed by acoustic interaction produces search results that include audio-visual data, a user may wish to present the video portion of the data along with the audio portion, rather than the audio portion alone. Further, a user also may wish to perform a non-speech interaction to maintain privacy.

Figure 1:
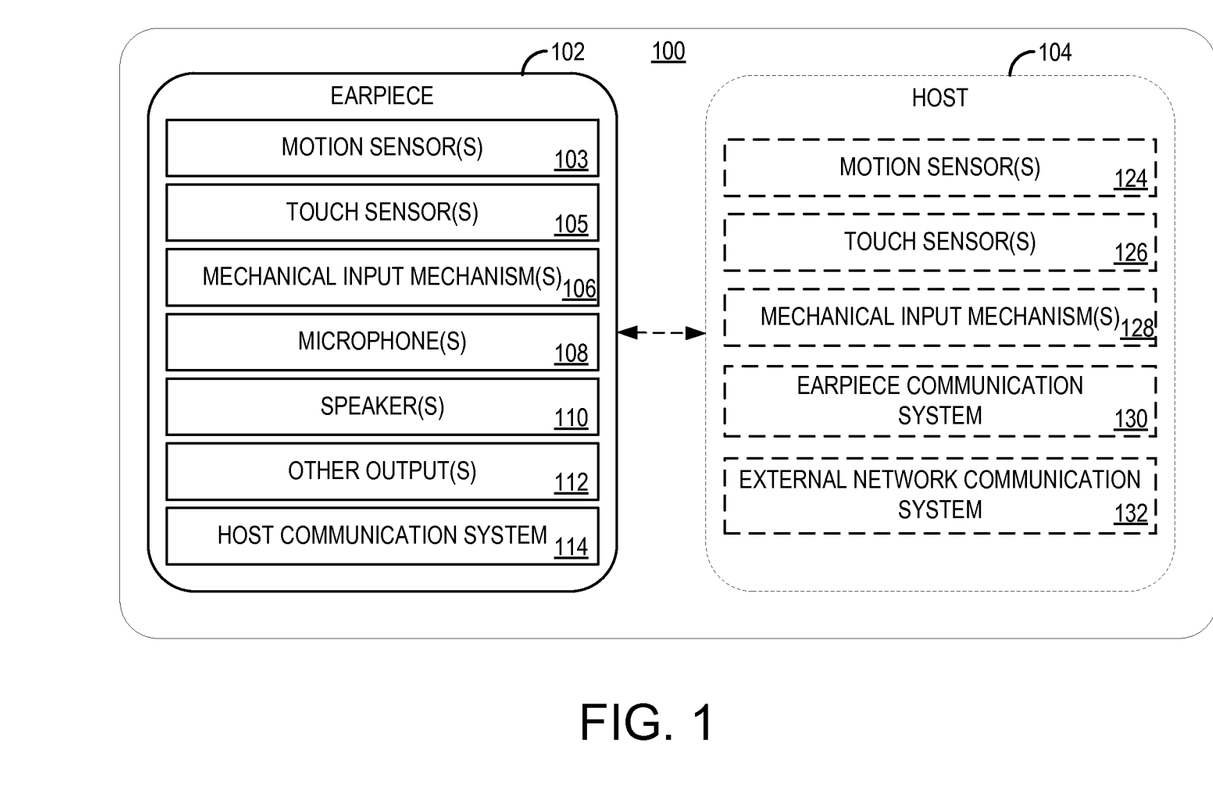
FIG. 1 shows a block diagram of an example speech-based computing device.

Thus, the examples disclosed herein relate to the use of a device external to a speech-based computing device to present visual information and conduct visual interactions. FIG. 1 shows a block diagram of an example speech-based computing device 100. The speech-based computing device 100 comprises an earpiece 102 and an optional host 104 that may be configured to be worn on a user. For example, the host 104 may be clipped to a user's body and/or clothing, carried in a pocket, or worn in any other suitable manner. It will be understood that the speech-based computing device 100 also may be implemented as a single, wearable computing device without a separate host device in some examples.

The earpiece 102 comprises one or more sensors for receiving user input. Such sensors may include, but are not limited to, motion sensor(s) 103, touch sensor(s) 105, mechanical input mechanism(s) 106, and microphone(s) 108. Any suitable motion sensor(s) may be used, including but not limited to one or more gyroscope(s), accelerometer(s), magnetometer(s), and/or other sensor that detects motion in one or more axes. Likewise, any suitable touch sensor may be used, including but not limited to capacitive, resistive, and optical touch sensor(s). Examples of suitable mechanical input mechanism(s) 106 may include, but are not limited to, scroll wheel(s), button(s), dial(s), and/or other suitable mechanical input mechanism. The earpiece 102 also includes one or more outputs for presenting information to a user, such as one or more speakers 110 and potentially other output mechanisms 112, such as a haptic output (e.g., vibrational output system).

The earpiece 102 further includes a host communication system 114 configured to enable communication with the host 104 or other personal assistant computing device component. The host communication system 114 may communicate with the host 104 via any suitable wired or wireless communication protocol.

The host 104 also includes one or more input mechanisms for receiving user inputs. For example, the host may include one or more motion sensor(s) 124, touch sensor(s) 126, and mechanical input mechanism(s) 128, such as those described above for the earpiece 102. The host 104 also includes an earpiece communication system 130 for communicating with the earpiece 102, and an external network communication system 132 for communicating with external devices. For example, the host 104 may be configured to communicate with external devices via a network (e.g. a computer network, mobile phone network, and/or other suitable external network), and also via direct connections (e.g. using a direct wireless protocol such as BLUETOOTH or WiFi direct).

As mentioned above, some computing device interactions that may be encountered while using a speech-based computing device may include a visual component that a user may wish to experience. As one non-limiting example, a user may use a speech-based computing device to contact a taxi service and request a taxi, and then may wish to track a location of the reserved taxi via a map.

Accordingly, examples are disclosed herein that relate to providing extended visual functionalities to a speech-based computing device by connecting to an extender device (e.g. a nearby external computing device having a display) to enable the presentation of visual content and enable user interaction therewith on an on-demand basis. By connecting to and communicating with such a device, a speech-based computing system may allow the presentation of visual content (e.g. a graphical user interface, video data, map data, etc.) as needed, while maintaining advantages of speech-based interaction such as those mentioned above.

Figure 2:
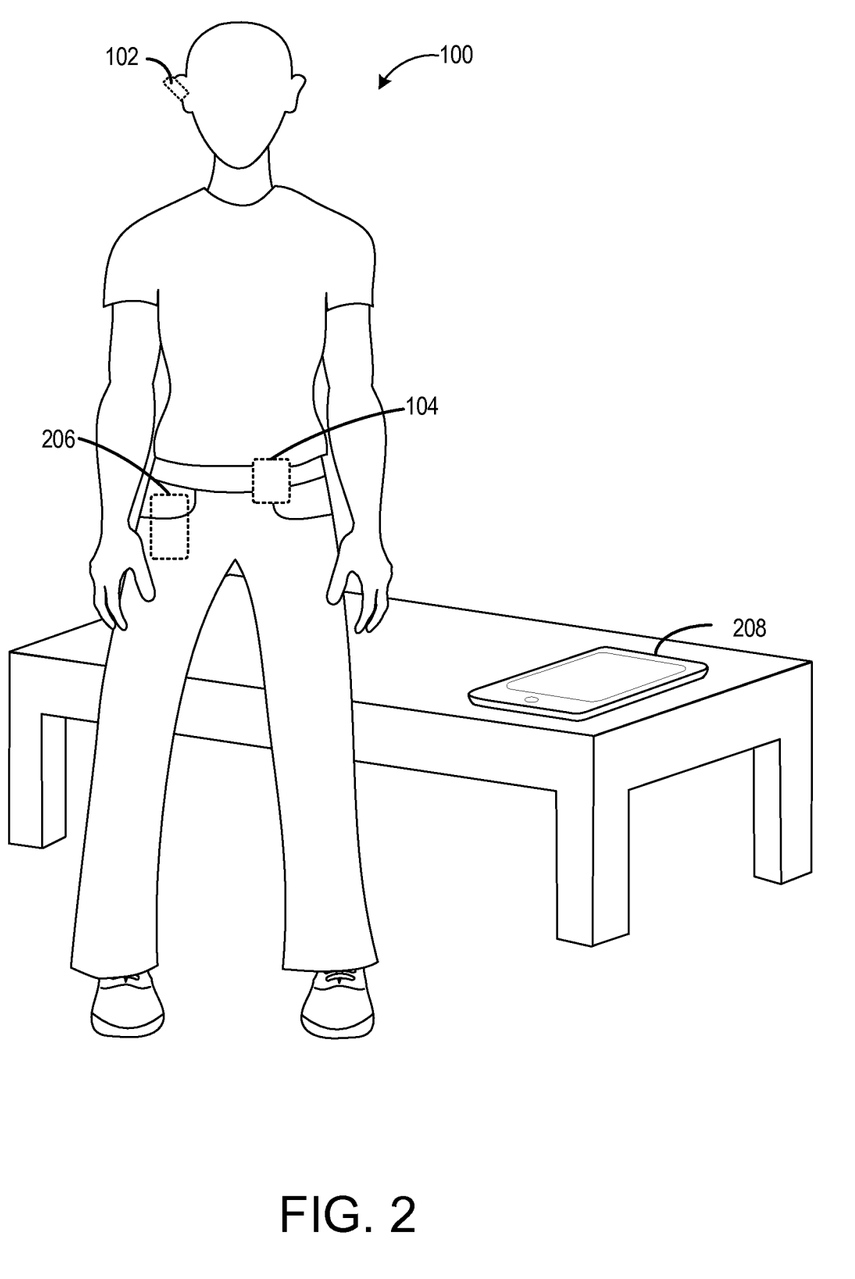
FIG. 2 shows an example speech-based computing device and example extender display device(s).

FIG. 2 illustrates a schematic depiction of the speech-based computing device 100, and illustrates various external devices that may be used as an extender device for the speech-based computing device 100, namely, a mobile device 206 and a tablet computing device 208. Depending upon a location of a user wearing the speech-based computing device 100, other external devices may be available for use as an extender device. For example, a home environment may include a television and/or video game system to which the speech-based computing device 100 may connect for screen-based interactions. Likewise, a car environment may include an in-dash display for an onboard computing system. It will be understood that the speech-based computing device 100 may be configured to connect to any suitable type and number of external devices.

Figure 3:
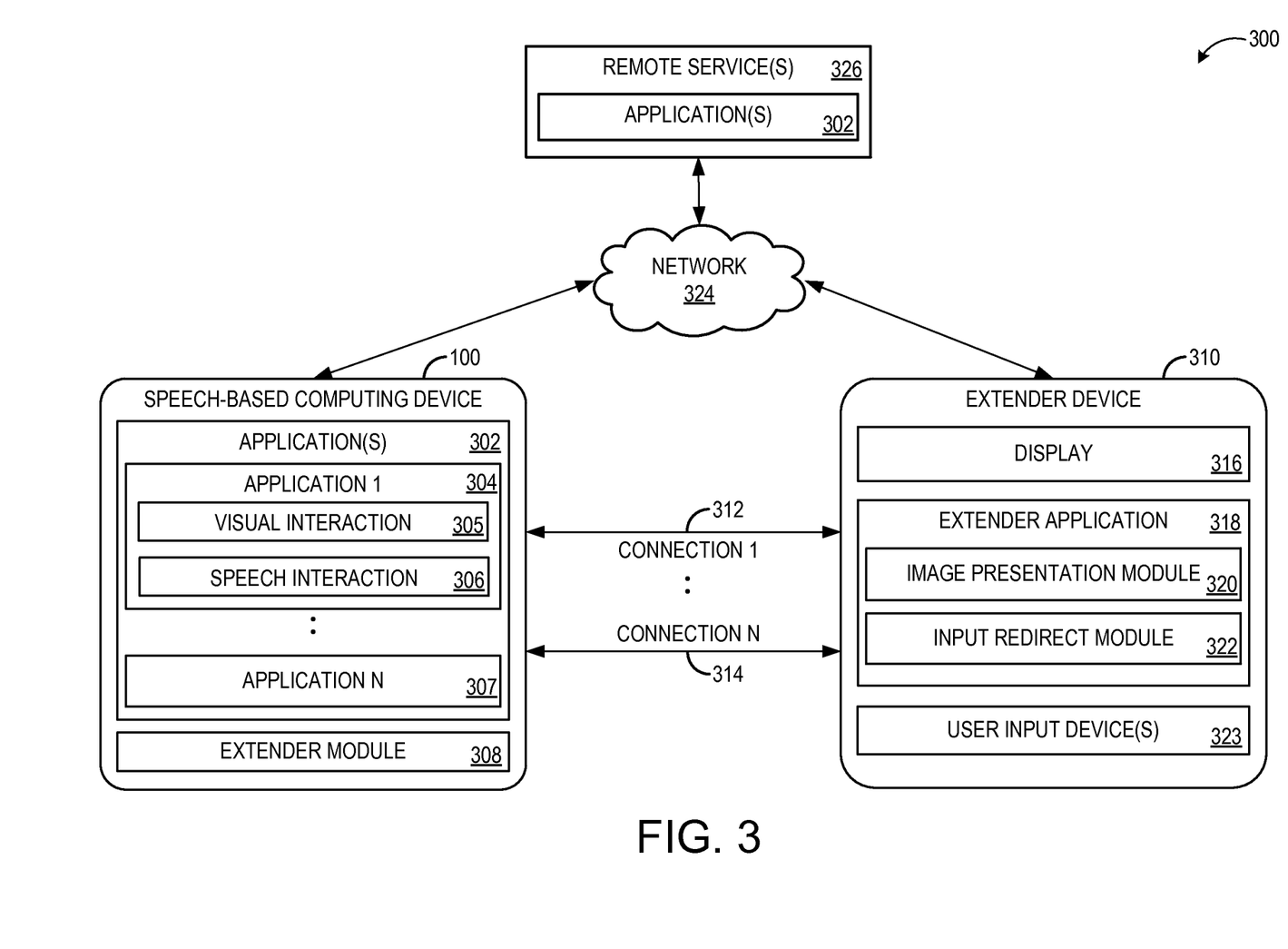
FIG. 3 shows a block diagram of an example system comprising a speech-based computing device.

FIG. 3 depicts an example system environment 300 for the speech-based computing device 100. The speech-based computing device 100 may be configured to execute one or more applications 302, illustrated as application 1 304 and application N 307. One or more of the applications may include a visual interaction component 305 in addition to a speech-based interaction component 306. The speech-based computing device 100 further comprises an extender module 308 configured to connect to an extender device 310 via one or more wireless protocols, illustrated as a connection 1 312 through a connection N 314, to provide image content for display via a display 316. Examples of wireless communication protocols include BLUETOOTH protocols and Wi-Fi protocols. The speech-based computing device 100 may connect to the extender device 310 directly, or via other network components.

The extender device 310 likewise includes an extender application 318 configured to communicate with the extender module 308 of the speech-based computing device 100. The depicted extender application 318 includes an image presentation module 320 for receiving and processing image data received from the speech-based computing device 100 for presentation on display 316. The extender device 310 further includes one or more user input device(s) 323 with which a user may interact with the displayed content from the speech-based computing device 100. Example input devices include, but are not limited to, touch sensors (e.g. a touch-sensitive display), mechanical buttons, and motion sensors. The extender application 318 further may comprise an input redirect module 322 that redirects user inputs received via user input devices 323 to the speech-based computing device 100.

In some examples, the speech-based computing device 100 and the extender device 310 may utilize smart multi-transport switching, wherein communication may switch between connections depending upon such factors as connection performance, bandwidth needs, power considerations, etc. In some instances, communication may take place across multiple channels in a temporally overlapping manner, while in other embodiments data may be sent via a single channel at a time. In either case, the use of multi-transport switching may allow the speech-based computing device 100 to balance a network traffic load dynamically.

As a non-limiting example, connection 1 312 may represent a BLUETOOTH connection, and connection N 314 may represent a Wi-Fi connection. The speech-based computing device 100 may monitor each connection for network performance characteristics, such as retransmission rates, and dynamically switch between connections based upon changes in the performance characteristics and/or characteristics of the data being transferred between devices. In another example, the speech-based computing device 100 may be configured to connect to the extender device 310 via one connection (e.g. WiFi) by default when available, and to connect via another connection (e.g. BLUETOOTH) when Wi-Fi is unavailable. Once connected via BLUETOOTH, the speech-based computing device 100 may still monitor for the availability of Wi-Fi, and may automatically switch to Wi-Fi when detected. In yet another example, the speech-based computing device 100 may be configured to connect to the extender device 310 via a connection selected by the user and/or based on user preferences.

The speech-based computing device 100 may be configured to connect to one or more extender devices in any suitable manner. For example, the speech-based computing device 100 may be configured to discover one or more extender devices by detecting a beacon signal emitted by each of the one or more extender devices. Further, where more than one extender device is determined to be available, the speech-based computing device 100 may be configured to connect preferentially to a default extender device, for example, as specified by a user, based upon the capabilities of the extender (e.g. computing resources, communication resources, display characteristics, etc.), and/or based upon any other suitable factors.

Likewise, the speech-based computing device 100 may be configured to connect to one or more extender devices based upon any suitable triggering event or circumstance. For example, the speech-based computing device 100 may connect to the extender device 310 automatically upon detecting the device, when directed by user input, and/or when a display-based interaction arises in an application being executed on the speech-based computing device 100. Once connected to the extender device 310, the speech-based computing device 100 may then provide image data to the extender device 310 for display when an image-based interaction arises in an application being executed on the speech-based computing device 100.

In some examples, image data provided by the speech-based computing device 100 to the extender device 310 may be based on information regarding the display 316 of the extender device 310, such that the image data is appropriately rendered for display on the extender device 310. Examples of such information include, but are not limited to, a frame rate and a resolution of the extender device display 316.

The speech-based computing device 100 further may be configured to generate and provide image data that is based on a current orientation of the extender device display 316. The orientation of a display of the display 316 may depend on a position in which the extender device 310 is currently placed or held by a user, and may change during a screen-based interaction. Thus, information regarding the orientation of the display 316 may be updated during a use session, as described in more detail below.

In some implementations, the speech-based computing device 100 may utilize a remote service 326 to send image data via a network 324 to the extender device 310. For example, applications 302 that are executed on the speech-based computing device 100 also may be executed by the remote service 326. Upon reaching a screen interaction, the speech-based computing device 100 may notify the extender device 310 of a network address of the remote service 326, and the extender device 310 may then interact with the remote service 326 to obtain image data for display. Rendering and compressing image data via the remote service 326 may help to reduce power consumption by the speech-based computing device 100 relative to rendering and compressing image data at the speech-based computing device 100. Further, the input redirect module 322 may be configured to redirect information regarding user inputs at the extender device 310 to the remote service 326, rather than directly back to the speech-based computing device 100. In other examples, user inputs are directed to the speech-based computing device 100, and then forwarded to the remote service 326. In this manner, the states of the applications running on the remote service 326 and the speech-based computing device 100 may be synchronized.

Figure 4:
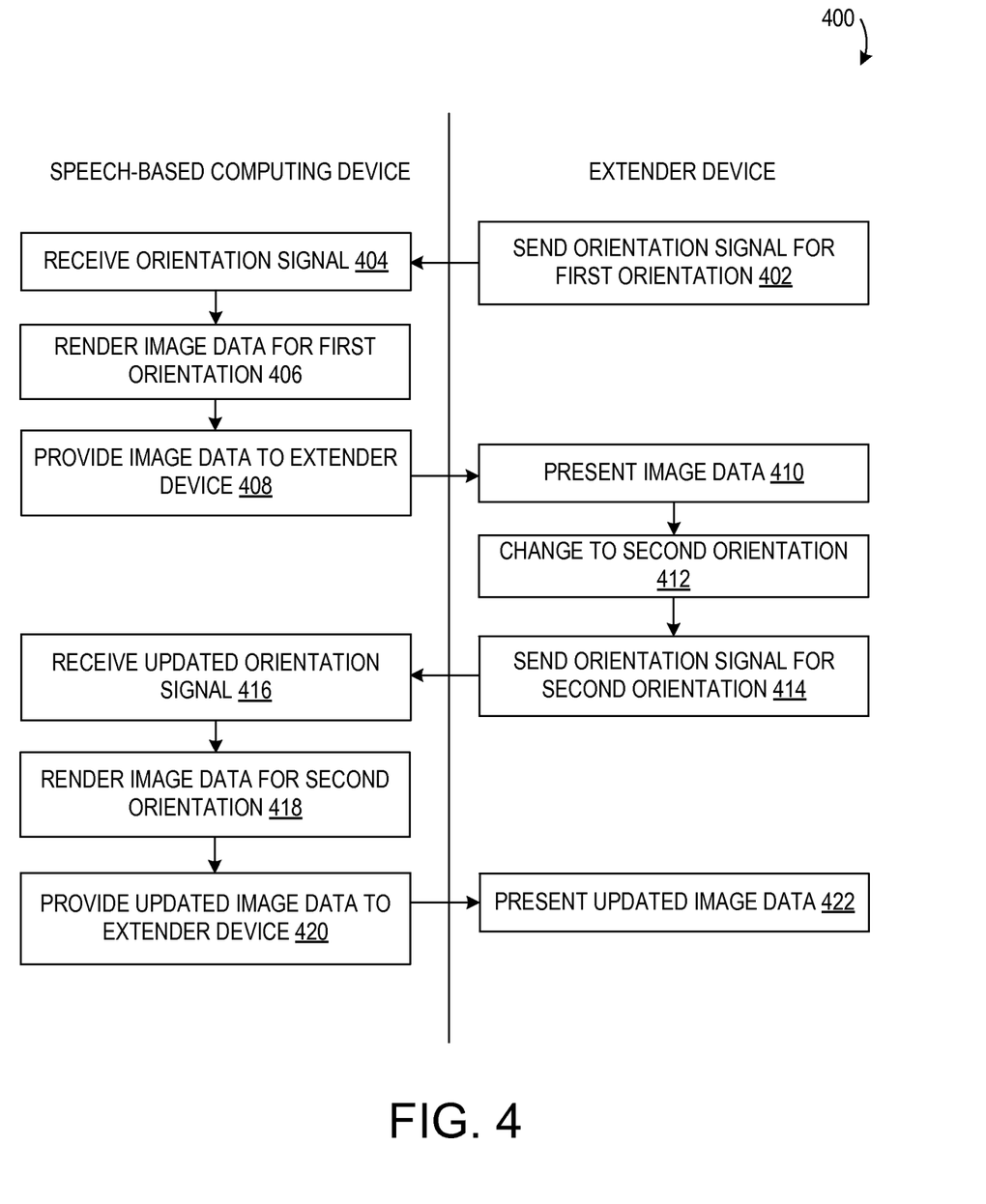
FIG. 4 shows a flow diagram depicting an example of updating information regarding an extender device display.

FIG. 4 shows a flow diagram illustrating the updating of information at the speech-based computing 100 regarding an orientation of the display of the extender device 310. At 402, the extender device 310 sends an orientation signal (e.g. via the input redirect module) corresponding to a first orientation of the extender device display to the speech-based computing device (e.g. a portrait orientation). At 404, the speech-based computing device 100 receives the orientation signal, at 406 renders image data for the first orientation, and at 408 provides the image data to the extender device 310. The extender device 310 then presents the image data to the display at 410. At 412, the extender device 310 changes from the first orientation to a second orientation, e.g. a landscape orientation, and sends an orientation signal for the second orientation at 414. The speech-based computing device 100 receives the updated orientation signal at 416. The speech-based computing device 100 may then render image data for the second orientation at 418, and provide the updated image data at 420 for presentation on the extender device 310 at 422. It will be understood that the extender application running on the extender device 310 may be configured to send the orientation signal on a periodic basis regardless of whether the signal indicates a change, or may be configured to analyze the orientation signal and send orientation information when a change in orientation is detected.

Figure 5:
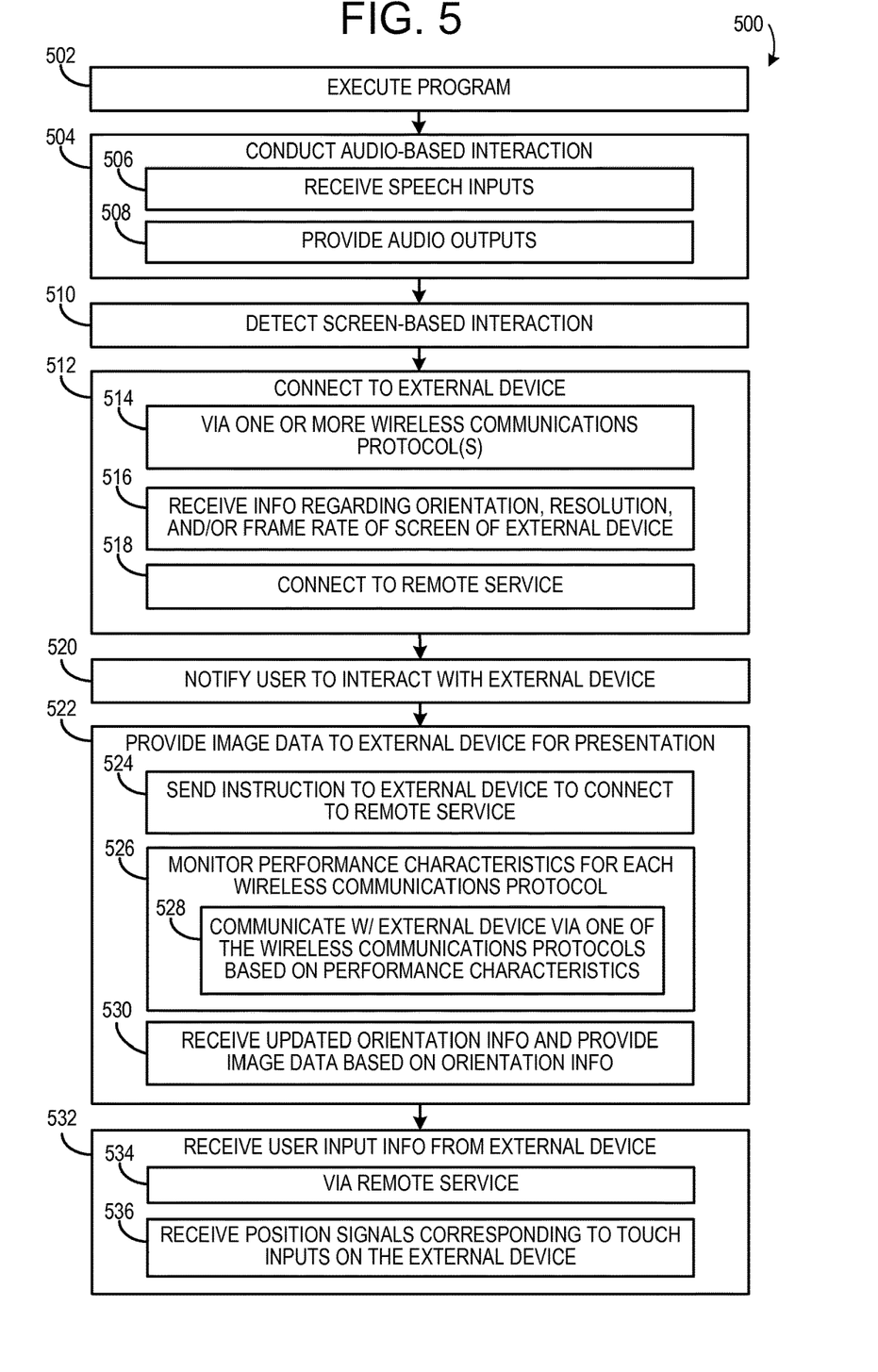
FIG. 5 shows an example method of providing display-based interactions for a speech-based computing device.

FIG. 5 shows a flow diagram illustrating an example method 500 for providing display-based interactions for a speech-based computing device. Method 500 comprises, at 502, executing a program, such as an application configured to run on a speech-based computing device. Method 500 further comprises, at 504, conducting an acoustic-based interaction of the program by receiving speech inputs and/or providing audio outputs, shown at 506 and 508 respectively.

Method 500 further comprises detecting a screen-based interaction of the program at 510, and at 512, connecting to an external device having a display screen. The connection to the external device may be triggered by the detection of the screen-based interaction, or may be performed before the interaction is detected. As described above, the speech-based computing device may connect to the external device via one or more wireless communications protocols, as shown at 514, and in some examples may connect via multiple connections to enable dynamic load balancing of traffic between the speech-based computing device and the extender device. Further, when connecting to the external device, the speech-based computing device may receive information regarding aspects of the extender device, such as an orientation, resolution, and/or frame rate of the external device.

Further, in some examples, method 500 may also comprise, at 516, connecting to a remote service that may provide image data to the external device for display, which may help to conserve computing resources and reduce power consumption on the speech-based computing device compared to rendering and compressing image data on the speech-based computing device. Such a remote service may be configured to run an application that is also running on the speech-based computing device to produce the image data corresponding to the screen-based interaction. State information may be exchanged between the application on the speech-based computing device and the application on the remote service in any suitable manner.

Method 500 further comprises, at 520, notifying a user of the screen-based interaction, and at 522, providing image data to the extender device for presentation. The image data may be provided directly from the speech-based computing device, or may be provided by sending an instruction to the external device to connect to and obtain the image data from the remote service, as indicated at 524.

Where the speech-based computing device and the extender device are connected via multiple connections, method 500 may further comprise, at 526, monitoring one or more performance characteristics for each of the wireless communications connections, and at 528, selecting a wireless connection for communication based on the one or more performance characteristics. The selected wireless connection may be dynamically changed to facilitate the transmission of data between the devices.

Further, where the extender device includes a motion sensor and/or orientation sensor, method 500 may further comprise, at 530, receiving updated orientation information and providing image data based on the orientation information. This may allow image data rendered at the speech-based computing device and/or the remote service to be rendered based upon a current orientation of the extender device.

As mentioned above, user inputs received at the extender device may be redirected by the extender device to the speech-based computing device as an interaction with the program being executed on the extender device. As such, method 500 comprises, at 532, receiving user input information from the external device. Where a remote service is used to render the image data, the input may be received from the remote service, as indicated at 534, or received directly from the extender device and forwarded to the remote service. The inputs may take the form of position signals corresponding to touch inputs on a touch sensor of the external device as indicated at 536, and/or may take any other suitable form.

If or when a display interaction is no longer needed, the speech-based computing device may be configured to automatically disconnect from the extender device, or maintain the connection more persistently. Disconnecting after each screen-based interaction may help to reduce power consumption, but also may introduce some lag in the screen-based experience, depending upon how quickly the connection can be established.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
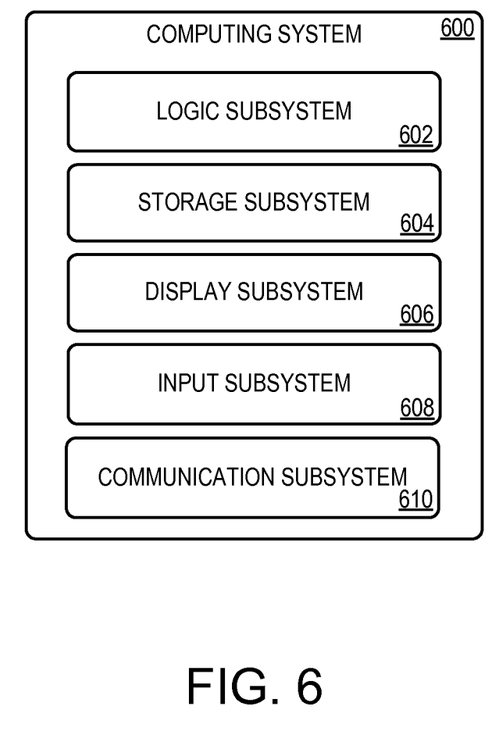
FIG. 6 shows a block diagram of an example computing system.

FIG. 6 schematically shows a non-limiting embodiment of a computing system 600 that can enact one or more of the methods and processes described above. Computing system 600 is shown in simplified form. Computing system 600 may take the form of one or more personal computers, server computers, tablet computers, home-entertainment computers, network computing devices, gaming devices, mobile computing devices, mobile communication devices (e.g., smart phone), and/or other computing devices, including but not limited to the speech-based computing devices and/or the extender computing devices disclosed herein.

Computing system 600 includes a logic subsystem 602 and a storage subsystem 604. Computing system 600 may optionally include a display subsystem 606, input subsystem 608, communication subsystem 610, and/or other components not shown in FIG. 6.

Logic subsystem 602 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Logic subsystem 602 may include one or more processors configured to execute software instructions. Additionally or alternatively, logic subsystem 602 may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage subsystem 604 includes one or more physical devices configured to hold instructions executable by the logic machine to implement the methods and processes described herein. When such methods and processes are implemented, the state of storage subsystem 604 may be transformed—e.g., to hold different data.

Storage subsystem 604 may include removable and/or built-in devices. Storage subsystem 604 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 604 may include volatile, nonvolatile, dynamic, static, read/write, read-only, random-access, sequential-access, location-addressable, file-addressable, and/or content-addressable devices.

It will be appreciated that storage subsystem 604 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 602 and storage subsystem 604 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module" and "program" may be used to describe an aspect of computing system 600 implemented to perform a particular function. In some cases, a module or program may be instantiated via logic subsystem 602 executing instructions held by storage subsystem 604. It will be understood that different modules and/or programs may be instantiated from the same application, service, code block, object, library, routine, API, function, etc. Likewise, the same module and/or program may be instantiated by different applications, services, code blocks, objects, routines, APIs, functions, etc. The terms "module" and "program" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 606 may be used to present a visual representation of data held by storage subsystem 604. This visual representation may take the form of a graphical user interface (GUI). As the herein described methods and processes change the data held by the storage machine, and thus transform the state of the storage machine, the state of display subsystem 606 may likewise be transformed to visually represent changes in the underlying data. Display subsystem 606 may include one or more display devices utilizing virtually any type of technology. Such display devices may be combined with logic subsystem 602 and/or storage subsystem 604 in a shared enclosure, or such display devices may be peripheral display devices.

When included, input subsystem 608 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 610 may be configured to communicatively couple computing system 600 with one or more other computing devices. Communication subsystem 610 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 600 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

Another example provides a wearable computing device comprising an acoustic receiver configured to receive speech inputs, a speaker configured to present audio outputs, a communications subsystem configured to connect to an external device, a logic subsystem configured to execute instructions, and a storage subsystem comprising instructions executable by the logic subsystem to execute a program, connect to the external device via a wireless communications protocol, conduct an audio-based interaction of the program via the speech inputs received at the acoustic receiver and the audio outputs provided by the speaker, upon reaching a screen-based interaction of the program, notify a user via the speaker to interact with the external device, and provide image data to the external device for presentation via a screen of the external device. The instructions may additionally or alternatively be executable by the logic subsystem, wherein the wireless communications protocol is a first wireless communications protocol, to connect to the external device also via a second wireless communications protocol. The instructions may additionally or alternatively be executable to monitor one or more performance characteristics for each of the first wireless communications protocol and the second wireless communications protocol, and to communicate with the external device via one of the first wireless communications protocol and the second wireless communications protocol based upon the one or more performance characteristics. The instructions may additionally or alternatively be executable to connect to the external device by detecting a beacon signal emitted by the external device. The instructions may additionally or alternatively be executable to connect to one or more additional external devices. The instructions may additionally or alternatively be executable to receive from the external device information regarding one or more of an orientation, a frame rate, and a resolution of the screen of the external device. The instructions may additionally or alternatively be executable to receive user inputs for the program made via the external device, wherein the user inputs may include position signals corresponding to touch inputs on the external device.

Another example provides a wearable computing device comprising an acoustic receiver configured to receive speech inputs, a speaker configured to present audio outputs, a communications subsystem configured to connect to an external device and a remote service, a logic subsystem configured to execute instructions, and a storage subsystem comprising instructions executable by the logic subsystem to connect to the remote service via a computer network, connect to the external device, execute a program locally on the wearable computing device, conduct an audio-based interaction of the program via the speech inputs received at the acoustic receiver and the audio outputs provided by the speaker, upon reaching a screen-based interaction of the program, notify a user to interact with the external device, instruct the external device to obtain the image data from the remote service for the screen-based interaction, and receive user input information from the external device during the screen-based interaction. The instructions may additionally or alternatively be executable to connect to the external device via a first wireless communications protocol and a second wireless communications protocol, to monitor one or more performance characteristics for each of the first wireless communications protocol and the second wireless communications protocol, and to communicate with the external device via one of the first wireless communications protocol and the second wireless communications protocol based upon the one or more performance characteristics. The instructions may additionally or alternatively be executable to receive the user input information from the external device via the remote service. The instructions may additionally or alternatively be executable to receive the user input information directly from the external device, and to forward the user input information received directly from the external device to the remote service. The instructions may additionally or alternatively be executable to receive from the external device information regarding one or more of an orientation, a frame rate, and a resolution of the screen of the external device. Additionally or alternatively, the user input information may include position signals corresponding to touch inputs on the external device.

Another example provides, on a wearable computing device comprising an acoustic receiver and a speaker, a method comprising executing a program, connecting to an external device via a wireless communications protocol, conducting an audio-based interaction of the program via speech inputs received at the acoustic receiver and audio outputs provided by the speaker, upon reaching a screen-based interaction of the program, notifying a user via the speaker to interact with the external device, receiving from the external device orientation information regarding an orientation of a screen of the external device, providing image data to the external device based upon the orientation information for presentation via the screen of the external device, and receiving user input information from the external device during the screen-based interaction. The method may additionally or alternatively include, wherein the wireless communications protocol is a first wireless communications protocol, connecting to the external device also via a second wireless communications protocol. The method may additionally or alternatively include monitoring one or more performance characteristics for each of the first wireless communications protocol and the second wireless communications protocol, and to communicate with the external device via one of the first wireless communications protocol and the second wireless communications protocol based upon the one or more performance characteristics. The method may additionally or alternatively include wherein the user input information comprises position signals corresponding to touch inputs on the external device. The method may additionally or alternatively include connecting a remote service via a computer network, wherein receiving the user input information from the external device comprises receiving the user input information via the remote service. Any or all of the above-described examples may be combined in any suitable manner in various implementations.

The invention claimed is:

1. A wearable computing device in the form of an earpiece and not having a display screen, the earpiece comprising:
an acoustic receiver configured to receive speech inputs;
a speaker configured to present audio outputs;

a communications subsystem configured to connect to an external extender device comprising a display;

a logic subsystem residing on the wearable computing device, the logic subsystem configured to execute instructions; and a storage subsystem residing on the wearable computing device, the storage subsystem comprising instructions executable by the logic subsystem to execute a program on the wearable computing device, the program being executable to receive the speech inputs via the acoustic receiver of the earpiece and to provide outputs via the speaker of the earpiece, connect to the external extender device via a wireless communications protocol, conduct an audio-based interaction of the program being executed on the wearable computing device via the speech inputs received at the acoustic receiver of the earpiece and the audio outputs provided by the speaker of the earpiece, while conducting the audio-based interaction, upon reaching a screen-based interaction of the program being executed on the wearable computing device, output via the speaker of the earpiece a notification notifying a user of the screen-based interaction, and notify the user via audio output to interact with the external extender device during the screen-based interaction, the screen-based interaction comprising display of an image received from a remote computing device; and via the wireless communications protocol, send from the wearable computing device to the external extender device one or more of image data and an instruction to obtain image data from a remote service to the external extender device for presentation via the display of the external extender device.

2. The wearable computing device of claim 1, wherein the wireless communications protocol is a first wireless communications protocol, and wherein the instructions are executable by the logic subsystem to connect to the external extender device also via a second wireless communications protocol.

3. The wearable computing device of claim 2, wherein the instructions are executable by the logic subsystem to monitor one or more performance characteristics for each of the first wireless communications protocol and the second wireless communications protocol, and to communicate with the external extender device via one of the first wireless communications protocol and the second wireless communications protocol based upon the one or more performance characteristics.

4. The wearable computing device of claim 1, wherein the instructions are executable by the logic subsystem to connect to the external extender device by detecting a beacon signal emitted by the external extender device.

5. The wearable computing device of claim 1, wherein the instructions are executable by the logic subsystem to connect to one or more additional external devices.

6. The wearable computing device of claim 1, wherein the instructions are executable by the logic subsystem to receive from the external extender device information regarding one or more of an orientation, a frame rate, and a resolution of the display of the external extender device.

7. The wearable computing device of claim 6, wherein the instructions are executable by the logic subsystem to receive the image data from the remote computing device and send from the earpiece to the external extender device the image data received from the remote computing device.

8. The wearable computing device of claim 1, wherein the instructions are executable to receive user inputs for the program made via the external extender device, and wherein the user inputs comprise position signals corresponding to touch inputs on the external extender device.

9. A wearable computing device in the form of an earpiece and not having a display screen, the earpiece configured to utilize acoustic interactions as a primary user interface experience and comprising:

an acoustic receiver configured to receive speech inputs;

a speaker configured to present audio outputs;

a communications subsystem configured to connect to an external extender device and a remote service, the external extender device comprising a display;

a logic subsystem residing on the wearable computing device, the logic subsystem configured to execute instructions; and a storage subsystem residing on the wearable computing device, the storage subsystem comprising instructions executable by the logic subsystem to connect to the remote service via a computer network, connect to the external extender device, execute a program locally on the earpiece as the primary user interface experience, the program being executable to receive the speech inputs via the acoustic receiver of the earpiece and to provide outputs via the speaker of the earpiece, conduct an audio-based interaction of the program being executed on the wearable computing device via the speech inputs received at the acoustic receiver of the earpiece and the audio outputs provided by the speaker of the earpiece, while conducting the audio-based interaction, upon reaching a screen-based interaction of the program being executed on the wearable computing device, output via the speaker of the earpiece a notification notifying a user of the screen-based interaction, and notify the user via audio output to interact with the external extender device during the screen-based interaction, the screen-based interaction comprising display of an image received from a remote computing device;

send an instruction from the earpiece to the external extender device to obtain image data from the remote service for the screen-based interaction, and redirect user input information from the external extender device to the earpiece during the screen-based interaction.

10. The wearable computing device of claim 9, wherein the instructions are executable by the logic subsystem to connect to the external extender device via a first wireless communications protocol and a second wireless communications protocol, to monitor one or more performance characteristics for each of the first wireless communications protocol and the second wireless communications protocol, and to communicate with the external extender device via one of the first wireless communications protocol and the second wireless communications protocol based upon the one or more performance characteristics.

11. The wearable computing device of claim 9, wherein the instructions are executable by the logic subsystem to receive the user input information from the external extender device via the remote service.

12. The wearable computing device of claim 9, wherein the instructions are executable by the logic subsystem to receive the user input information directly from the external extender device.

13. The wearable computing device of claim 12, wherein the instructions are executable by the logic subsystem to forward the user input information received directly from the external extender device to the remote service.

14. The wearable computing device of claim 9, wherein the instructions are executable by the logic subsystem to send image data from the earpiece to the external extender device.

15. The wearable computing device of claim 9, wherein the user input information comprises position signals corresponding to touch inputs on the external extender device.

16. On a wearable computing device in the form of an earpiece and not having a display screen, the earpiece configured to utilize acoustic interactions as a primary user interface experience and comprising an acoustic receiver and a speaker, a method comprising:
    executing a program on the earpiece as the primary user interface experience, the program being executable to receive speech inputs via the acoustic receiver of the earpiece and to provide outputs via the speaker of the earpiece;
    connecting to an external extender device comprising a display via a wireless communications protocol;
    conducting an audio-based interaction of the program being executed on the earpiece via the speech inputs received at the acoustic receiver of the earpiece and the audio outputs provided by the speaker of the earpiece;
    while conducting the audio-based interaction, upon reaching a screen-based interaction of the program being executed on the earpiece, outputting via the speaker of the earpiece a notification notifying a user of the screen-based interaction and to interact with the external extender device during the screen-based interaction, the screen-based interaction comprising display of an image received from a remote computing device;
    receiving from the external extender device orientation information regarding an orientation of the display of the external extender device;
    via the wireless communications protocol, providing image data to the external extender device based upon the orientation information for presentation via the display of the external extender device; and
    receiving user input information from the external extender device during the screen-based interaction.

17. The method of claim 16, wherein the wireless communications protocol is a first wireless communications protocol, and further comprising connecting to the external extender device also via a second wireless communications protocol.

18. The method of claim 17, further comprising monitoring one or more performance characteristics for each of the first wireless communications protocol and the second wireless communications protocol, and communicating with the external extender device via one of the first wireless communications protocol and the second wireless communications protocol based upon the one or more performance characteristics.

19. The method of claim 16, wherein the user input information comprises position signals corresponding to touch inputs on the external extender device.

20. The method of claim 16, further comprising connecting a remote service via a computer network, wherein receiving the user input information from the external extender device comprises receiving the user input information via the remote service.

* * * * *